United States Patent Office 3,553,848
Patented Jan. 12, 1971

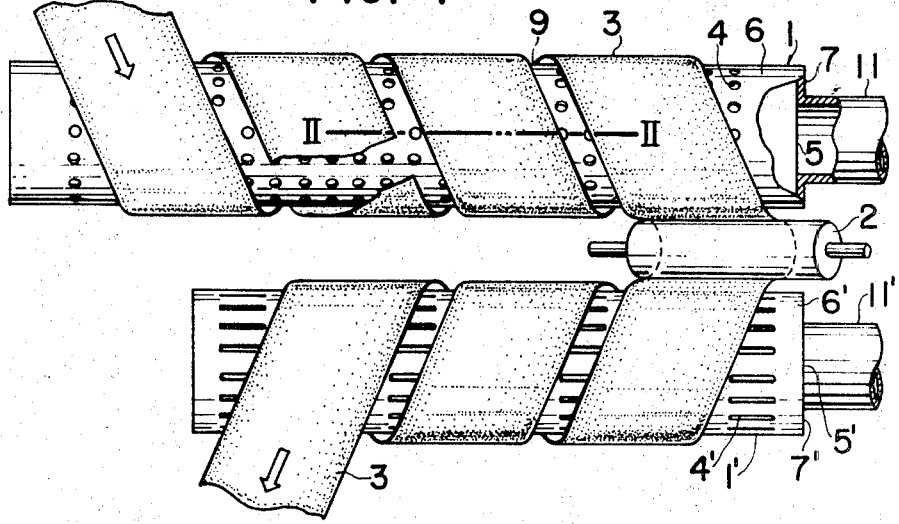
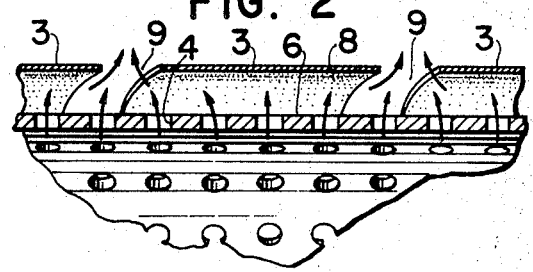
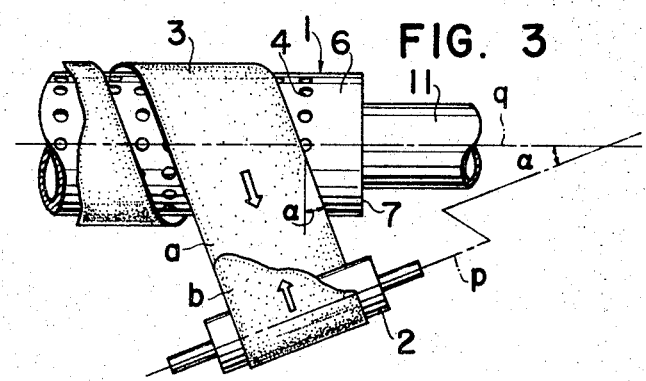

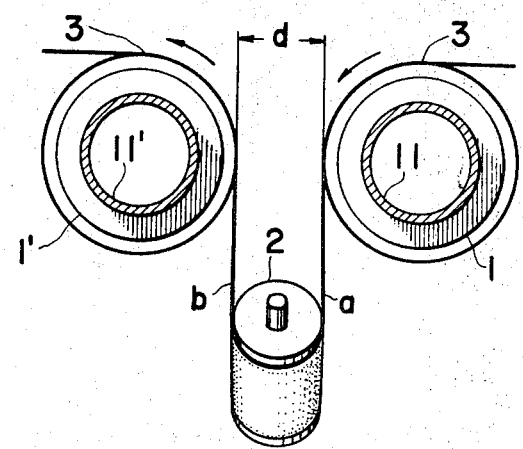
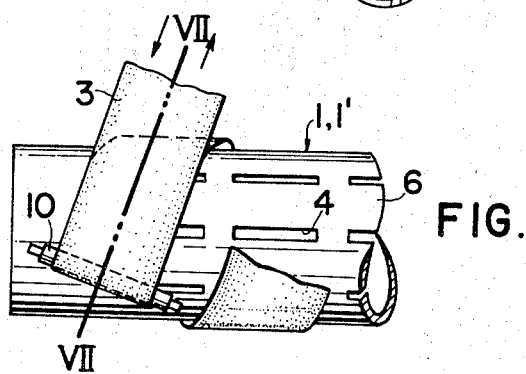
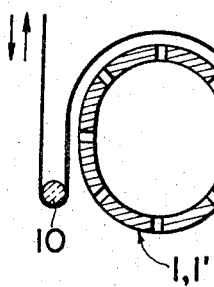

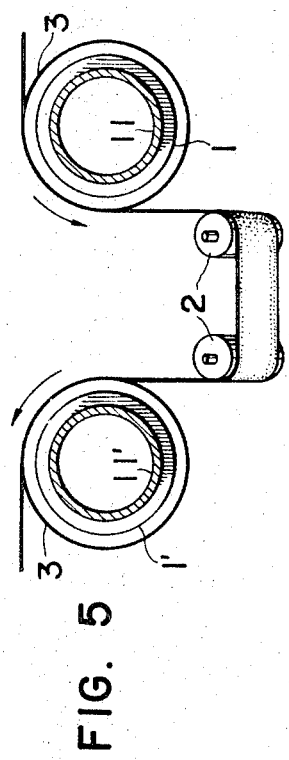
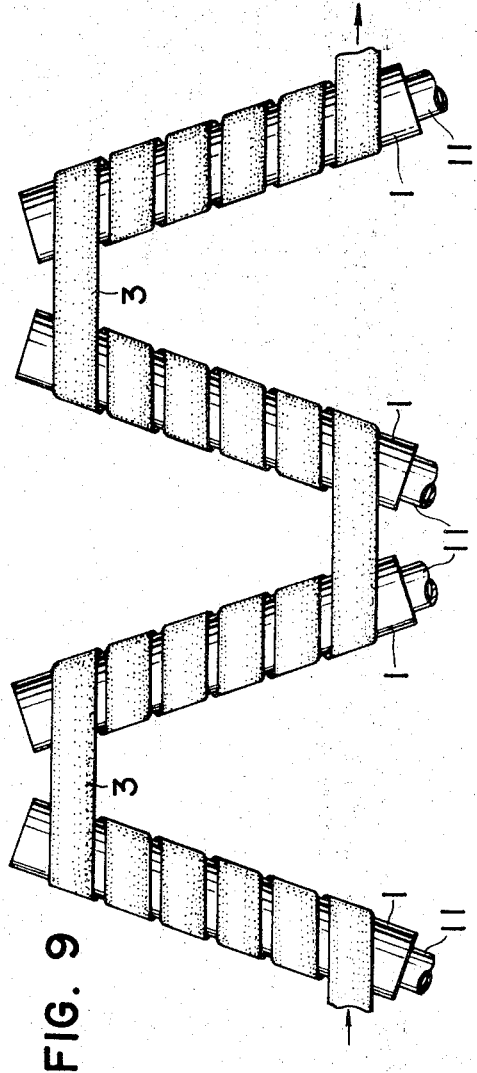
FIG. 5
FIG. 9

3,553,848
DRYING APPARATUS FOR FLEXIBLE SUPPORTS
Motoharu Kuroki and Akira Takagi, Kanagawa, Japan, assignors to Fuji Photo Film Co., Ltd., Kanagawa, Japan
Filed June 26, 1969, Ser. No. 836,727
Claims priority, application Japan, July 20, 1968, 43/51,448
Int. Cl. F26b 13/20
U.S. Cl. 34—115                    5 Claims

ABSTRACT OF THE DISCLOSURE

An apparatus for drying a flexible support having cylindrical air chambers with air inlets and air outlets for supporting the support as it moves in a helical path around the air chambers and a roller means arranged between the air chambers for guiding the support from one air chamber to the other.

BACKGROUND OF THE INVENTION

Field of the invention

The present invention relates to an apparatus for continuously drying elonagted flexible supports such as papers, plastic films and the like, and in particular to an apparatus for concretely and effectively carrying out the drying method disclosed in our copending U.S. application Ser. No. 711,239 entitled "Process for Drying Pliable Supports," filed on Mar. 7, 1968 now U.S. Pat. No. 3,481,046 granted Dec. 2, 1969.

The aforesaid patent discloses a method for continuously drying an elongated flexible support. The drying method in accordance with our aforesaid patent is particularly effective for drying a support having solvent-containing coating layers. According to the invention disclosed in our aforesaid patent, a continuously moving flexible support is conveyed and dried without any contact with solid faces during the drying process, whereby the drying can be conducted effectively and economically. One embodiment of an apparatus for carrying out the drying method of our aforesaid patent is illustrated in FIG. 9 thereof. In such an apparatus, however, the support which is conveyed is apt to be fluttered at the portion between one cylindrical air chamber and another. Such an apparatus occupies a relatively large space because the cylindrical air chambers are not arranged in parallel with one another. This invention provides a drying apparatus for an elongated flexible support which eliminates the disadvantages above mentioned in carrying out the drying method of our patent.

SUMMARY OF THE INVENTION

A principal object of the present invention is to provide a drying apparatus for carrying out the drying method disclosed in our aforesaid patent which occupies a small space.

Another object of the present invention is to provide a drying apparatus for carrying out the drying method disclosed in our aforesaid patent which conveys the support stably.

Still another object of the present invention is to provide a drying apparatus for carrying out the drying method disclosed in our aforesaid patent which can provide different drying conditions such as temperature, humidity, air blowing off velocity and the like to the different steps of the drying process.

The drying apparatus for flexible supports in accordance with the present invention comprises a plurality of cylindrical air chambers disposed substantially parallel with one another having at least one air inlet and a number of air blow off outlets for supporting on an air cushion an elongated flexible support moving continuously around the air chamber through a helical passage with its surface to be dried facing inward. At least one middle roller is arranged between the cylindrical air chambers for guiding the support from one of the air chambers to another. The middle roller is also arranged so that the advancing direction of the support at the portion where the support moves apart from the helical passage around one of the air chambers is substantially parallel to and reverse of the advancing direction of the support at the portion where the support moves toward the helical passage around another of the air chambers.

The cylindrical air chamber is provided in the cylindrical surface thereof with a number of air blow off outlets and one or more air inlets at the end face or at the portion of the cylindrical surface away from the passage of the support.

The middle roller for guiding the support described above is an ordinary roller rotatably supported with conventional bearings at both ends thereof. At least one roller is used, but where a plurality of rollers are used, they should be arranged in parallel with each other.

BRIEF DESCRIPTION OF THE DRAWINGS

Other objects, advantages, and applications of the present invention will be made apparent by the following detailed description of the preferred embodiments of the invention taken in conjunction with the accompanying drawings in which:

FIG. 1 is a plan view of the drying apparatus in accordance with an embodiment of the present invention, FIG. 2 is a cross sectional view of the drying apparatus taken along the line A—A in FIG. 1, FIG. 3 is an elevational view of a part of the drying apparatus shown in FIG. 1, FIG. 4 is a side view of the drying apparatus shown in FIG. 1, FIG. 5 is a side view of a drying apparatus in accordance with another embodiment of the present invention, FIG. 6 is an elevational view of an embodiment of the portion of the drying apparatus where the support is coming into or out of the drying apparatus, FIG. 7 is a cross sectional view of the portion of the drying apparatus shown in FIG. 6 taken along the line B—B, FIG. 9 is a plan view of an embodiment of our application A which is not in accordance with the present invention.

DETAILED DESCRIPTION OF THE INVENTION

Figure 8:
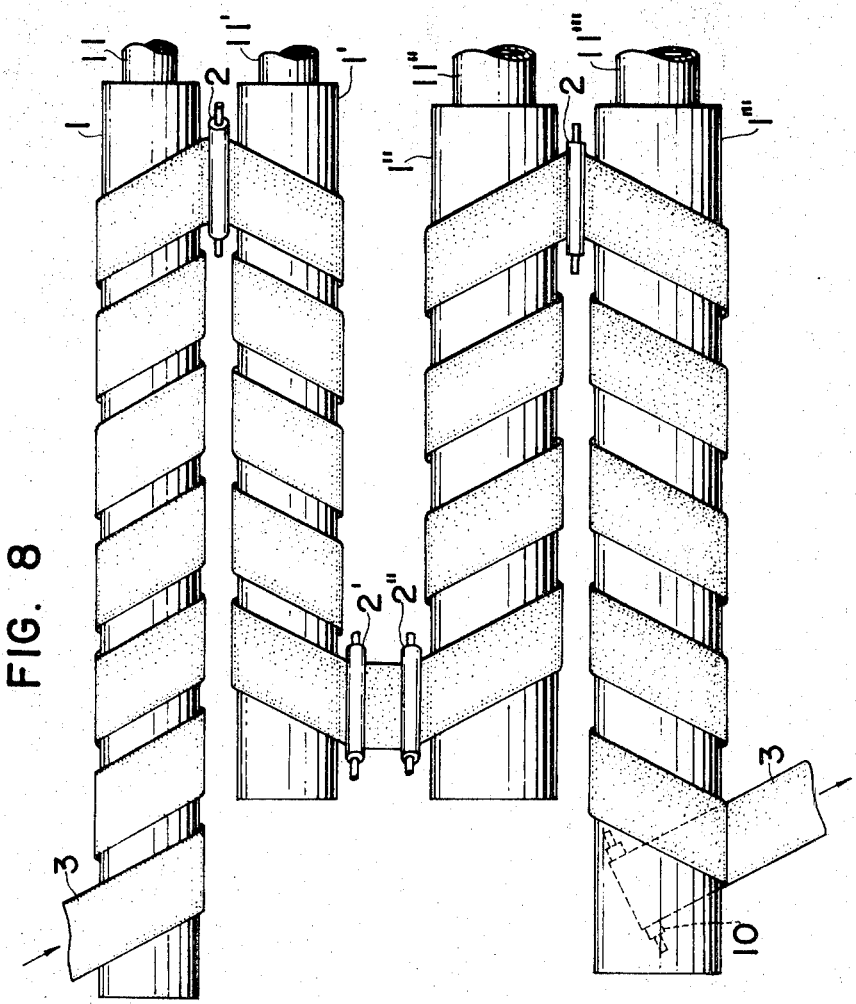
FIG. 8 is a plan view of a drying apparatus in accordance with another embodiment of the present invention.

Referring to FIGS. 1 through 4 which show an embodiment of the present invention, comprising a plurality of cylindrical air chambers disposed substantially parallel with each other and one middle roller for guiding the support 3. The cylindrical air chambers 1, 1' are provided with a number of holes or slit-like air blow off outlets 4, 4' on the cylindrical surface 6, 6' thereof and an air inlet 5, 5' at the end face 7, 7' thereof. The air for drying the support is supplied to the cylindrical air chambers 1, 1' from the air inlets 5, 5' through air ducts 11, 11' after being controlled as to temperature and humidity so as to fulfill the requirements of the drying process by ordinary drying air sources (not shown) such as blowers, filters, heaters, dehumidifiers and the like. With reference to the cylindrical air chamber 1, the air supplied to the air chamber 1 is blown off into the air cushion spacing 8 formed between the support 3 and the cylindrical surface 6 of the air chamber 1 through the air blow off outlets 4 and after supporting and drying the support 3, the air is released into the atmosphere through the gap 9 between the helical turns of the support 3. It is possible to recollect the released air by some adequate air collecting device and use it again for drying.

A so-called "wet" or "moist" continuous flexible support 3 carrying solvent-containing coating layers or the like is fed in the direction indicated by the arrow in FIG. 1 by some adequate feeding device (not shown). The said flexible support 3 is wrapped helically around the cylindrical air chamber 1 with the surface to be dried faced inward, and is advanced along the helical passage around the cylindrical air chamber 1 and is supported on the air cushion formed between the support 3 and the cylindrical surface 6. Then the support 3 moves away from its helical passage around the air chamber 1 at an end portion thereof and runs around the middle roller 2 which changes its direction of advance and puts the surface not to be dried in contact with the middle roller 2. After passing the middle roller 2, the flexible support 3 is brought into helical passage around the other cylindrical air chamber 1' and advances therearound with the surface to be dried faced inward. After this drying step, the flexible support 3 is brought out of its helical passage around the cylindrical air chamber 1' and drawn out of the apparatus through a proper tension device (not shown), and then is wound up by a conventional support wind-up device (not shown) or brought into another process by a proper feeding device (not shown).

The middle roller 2 is so disposed such that the advancing direction of the support $a$, moving away from its helical passage around the air chamber 1 and being brought into contact with the middle roller 2, will be reversed by 180°, that is, the advancing direction of the support $b$, moving toward the helical passage around the air chamber 1' and being brought out of contact with the roller 2 is made substantially parallel to and reverse of that of the support $a$, as shown in FIGS. 3 and 4. Such a relative position of the middle roller 2 to the cyindrical air chambers 1, 1' can be realized, for example, by providing a roller having a diameter substantially equivalent to the distance $d$ between the support around the air chamber 1 and the support around the air chamber 1' as shown in FIG. 4, and positioned between the air chambers 1, 1' so that the center line $p$ of the roller may be inclined to the center line $q$ of the air chambers by the angle substantially equivalent to the angle $\alpha$ of helix of the helical passage of the support around the air chambers as shown in FIG. 3.

FIG. 5 shows an embodiment of the drying apparatus of the present invention which is a variation of the embodiment shown in FIG. 1. A plurality of middle rollers 2 is provided for guiding the support between the air chambers.

The angle $\alpha$ of helix of the helical passage of the support 3 around the cylindrical air chamber 1, 1' is determined by the width of the support 3 and the diameter of the cylindrical air chamber 1' so that between the adjacent turns of the support 3 may be sufficient to release the drying air.

The air pressure and the flow rate thereof brought into the cylindrical air chambers 1, 1' is selected so that the air pressure in the spacing 8 between the cylindrical surface 6 of the air chamber 1 and the support 3 will be balanced with the tension applied to the support 3 and the air for drying will have a blow off velocity and flow rate sufficient to dry the support 3 effectively.

At the portions of the support 3 where the support comes into the helical passage around the cylindrical air chamber 1 and where the support begins to move apart from the cylindrical air chamber 1' in the embodiment shown in FIG. 1, the support 3 is apt to flutter because the drying air rapidly rushes along the support. In order to prevent fluttering of the support at these portions, a conventional supporting roller 10 may be disposed at these portions as shown in FIGS. 6 and 7. The roller 10 is so disposed that the support may be inverted just as the support is inverted at the middle roller 2 as mentioned above.

Referring to FIG. 8 showing another embodiment of the present invention, comprising four cylindrical air chambers 1, 1', 1'', 1''' disposed in parallel with one another, and four middle rollers 2, 2', 2'', 2''', and one supporting roller 10 provided at the portion where the support 3 begins to move away from the cylindrical air chamber 1'''. The last cylindrical air chamber 1''' is made larger and longer than the other air chambers 1, 1', 1'', that is, the diameter of the last air chamber 1''' is made larger than that of the air chambers 1, 1' and length of the last air chamber 1''' is made longer than that of the air chambers 1', 1''. Thus, the time for the support 3 to pass each of the air chambers is suitably controlled.

FIG. 9 shows an embodiment of the method disclosed in our aforementioned patent which is diffeernt from the present invention. It is apparent that the apparatus in accordance with the present invention has many advantages over the one shown in FIG. 9 from the viewpoint of space occupancy. In the apparatus shown in FIG. 9, the support 3 is apt to flutter at the portion where the support 3 is bridged from one cylindrical air chamber to another because of the rapid flow of the air along the support. In the present invention, the bridged portion of the support is supported by rollers, and as a result, the support is stably conveyed without flutter. Further, in the drying apparatus in accordance with the present invention, the drying conditions can be varied stepwise along with the advancement of the drying process by providing different temperature, humidity, and pressure or flow rate of the drying air to the different air chambers.

As is apparent from the above description, the present invention provides a superior apparatus from the viewpoint of space occupancy of carrying out the drying method disclosed in our aforementioned copending application.

Further, in accordance with the present invention, an apparatus is provided which can convey the support very stably when carrying out the drying method disclosed in our copending application and, in addition, it is possible to vary the drying conditions such as the temperature, humidity, blowing off velocity and the like of the drying air for the different air chambers in the different steps of the drying process.

Another advantage of the present invention is that the apparatus can be so constructed that the time in which the support takes to pass the respective air chambers can be set to the desired duration.

The drying apparatus in accordance with the present invention has the same advantages as those described in our copending application, that is, (a) the elimination of trouble caused by contact of the support with the solid surfaces of a number of guiding rollers during the drying process of the flexible support because the support is not brought into contact with any rollers except the small number of middle rollers and/or supporting rollers; (b) it is economical because there is no need to employ separate air for supporting the support other than the air used for drying; and (c) everyday maintenance can be easily managed because the construction of the apparatus is greatly simplified.

As is apparent from the description set forth hereinabove, the present invention is not restricted to the embodiments shown in the drawings, but various variations or combinations can be effected within the spirit and scope of the invention as defined in the following claims.

What is claimed is:

1. A drying apparatus for an elongated flexible support which comprises:
    (a) a plurality of cylindrical air chambers disposed in substantially parallel relationship with one another, each having one or more air inlets and a number of air blow off outlets for providing an air cushion for supporting an elonged flexible support which moves continuously around said air chamber through a helical passage with the surface of said support to be dried facing inward, and (b) at least one middle roller means arranged between said cylindrical air chambers for guiding said support from one of said air chambers to the other, said middle roller means being so arranged that the advancing direction of the support at the portion where said support moves away from said helical passage around one of said air chambers is substantially parallel to and reverse of the advancing direction of said support at the portion where the support moves toward said helical passage around the other of said air chambers.

2. The drying apparatus according to claim 1 wherein said middle roller means is a plurality of middle rollers arranged in parallel with each other between two adjacent air chambers.

3. The drying apparatus according to claim 1, further comprising one or more supporting rollers arranged at the portion where said flexible support comes into the apparatus and at the portion where the support exits from the apparatus.

4. The drying apparatus according to claim 1, wherein the drying air supplied to the different air chambers is conditioned differently.

5. The drying apparatus according to claim 1, wherein the diameters and the lengths of said air chambers are different from one another.

References Cited

UNITED STATES PATENTS

| | | | |
|---|---|---|---|
| 2,070,252 | 2/1937 | Borner | 34—152X |
| 2,532,562 | 12/1950 | Lorig | 34—153X |
| 2,659,225 | 11/1953 | Ewing | 34—153X |
| 3,125,268 | 3/1964 | Bartholomay | 226—97 |
| 3,290,795 | 12/1966 | Varreby | 34—115 |
| 3,303,576 | 2/1967 | Sisson | 34—115 |

MARTIN P. SCHWADRON, Primary Examiner

T. W. STREULE, Assistant Examiner

U.S. Cl. X.R.

34—156